T. HOTCHKISS.
Paper-Bag Machines.

No. 135,275.

6 Sheets--Sheet 3.

Patented Jan. 28, 1873.

Witnesses.
A. Benneckendorf.
N. A. Graham

Inventor:
T. Hotchkiss.
PER
Attorneys.

T. HOTCHKISS.
Paper-Bag Machines.
No. 135,275.  Patented Jan. 28, 1873.
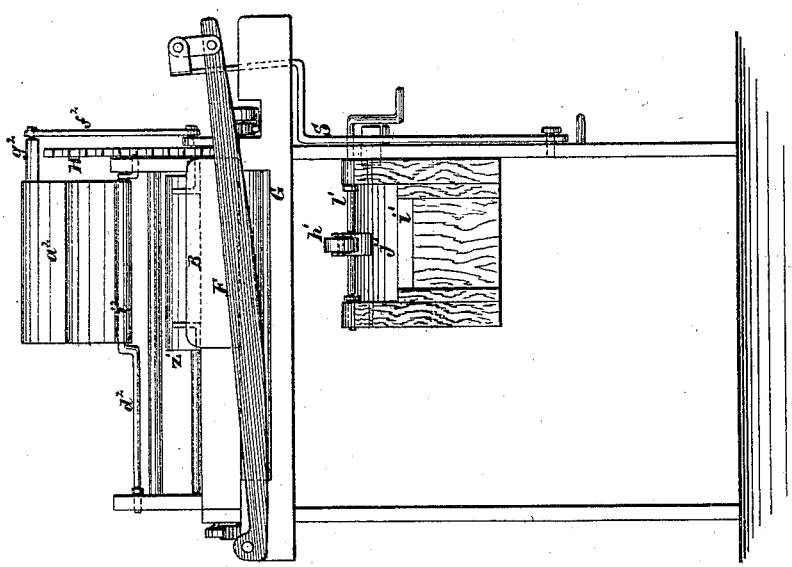
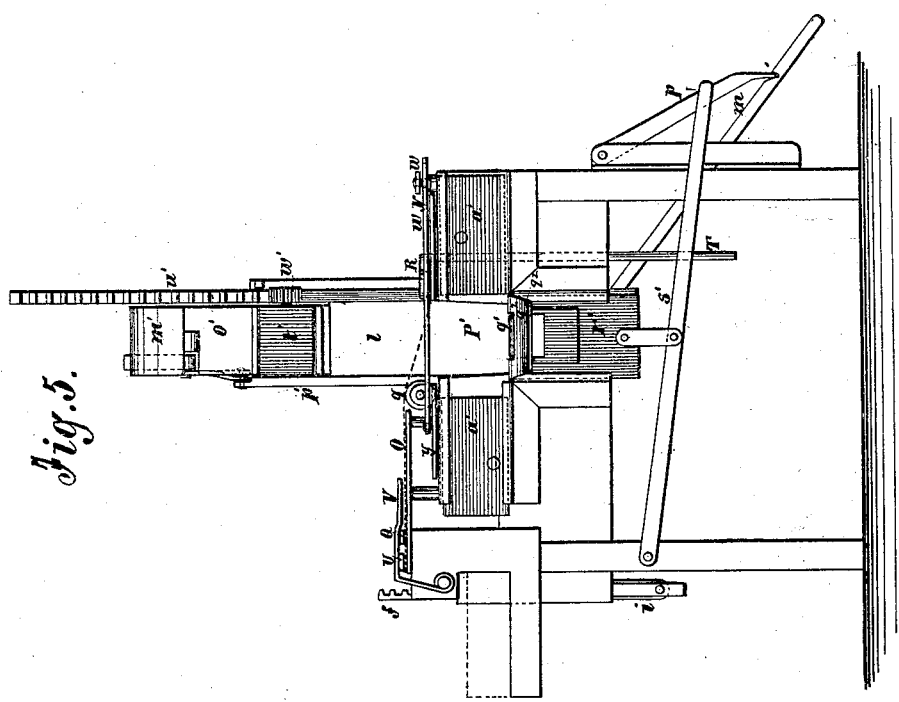
Witnesses:
A. Bennerendorf
W. A. Graham
Inventor:
T. Hotchkiss
per
Attorneys.

T. HOTCHKISS.
Paper-Bag Machines.
No. 135,275.
6 Sheets--Sheet 5.
Patented Jan. 28, 1873.
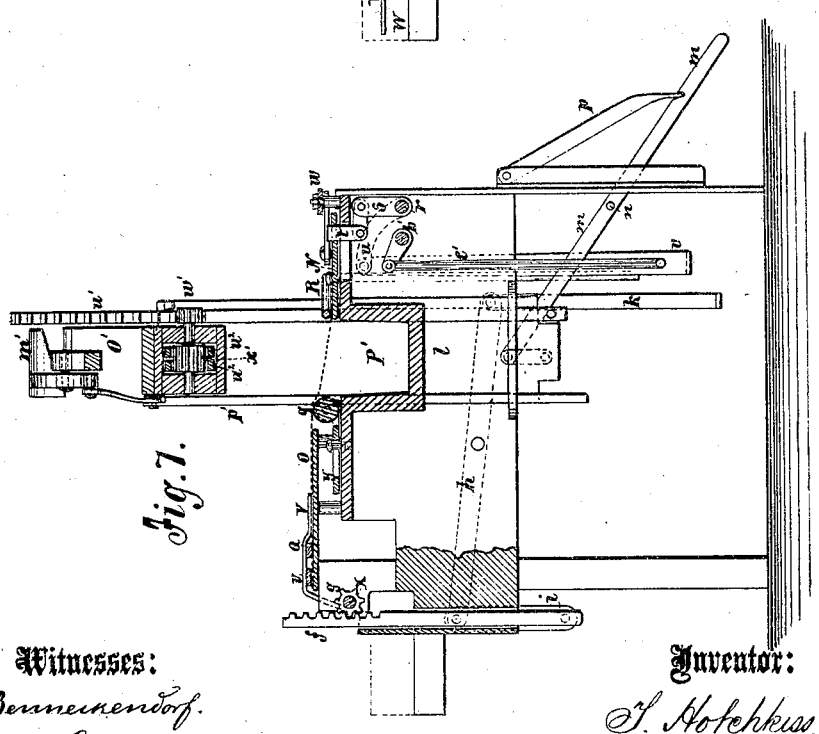
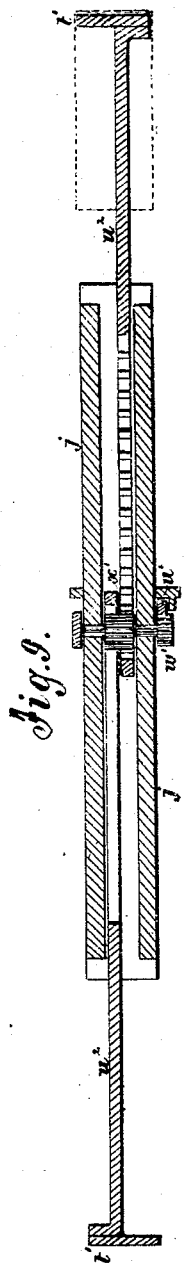
Witnesses:
A. Bennenendorf.
W. A. Graham
Inventor:
T. Hotchkiss
PER
Attorneys.

6 Sheets--Sheet 6.

T. HOTCHKISS.
Paper-Bag Machines.

No. 135,275.  Patented Jan. 28, 1873.

Witnesses:
A. Bennerkendorf.
W. A. Graham.

Inventor:
T. Hotchkiss
PER
Attorneys.

UNITED STATES PATENT OFFICE.

TRUMAN HOTCHKISS, OF STRATFORD, CONNECTICUT.

IMPROVEMENT IN PAPER-BAG MACHINES.

Specification forming part of Letters Patent No. 135,275, dated January 28, 1873.

*To all whom it may concern:*

Be it known that I, TRUMAN HOTCHKISS, of Stratford, in the county of Fairfield and State of Connecticut, have invented a new and Improved Paper-Bag Machine, of which the following is a specification:

The invention consists in the improvement of paper-bag machines, as hereinafter described and pointed out in the claim.

Figure 1:
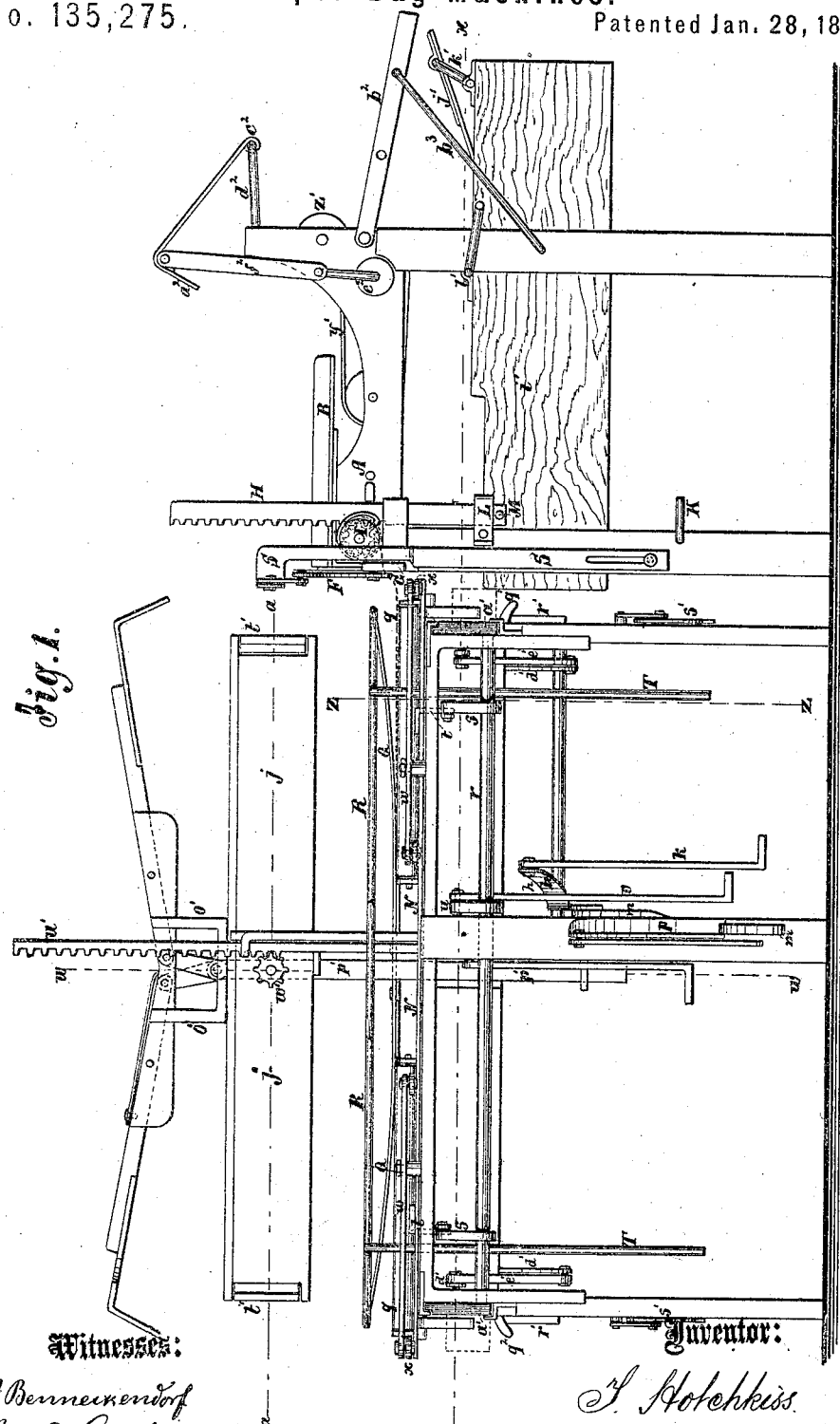
Figure 2:
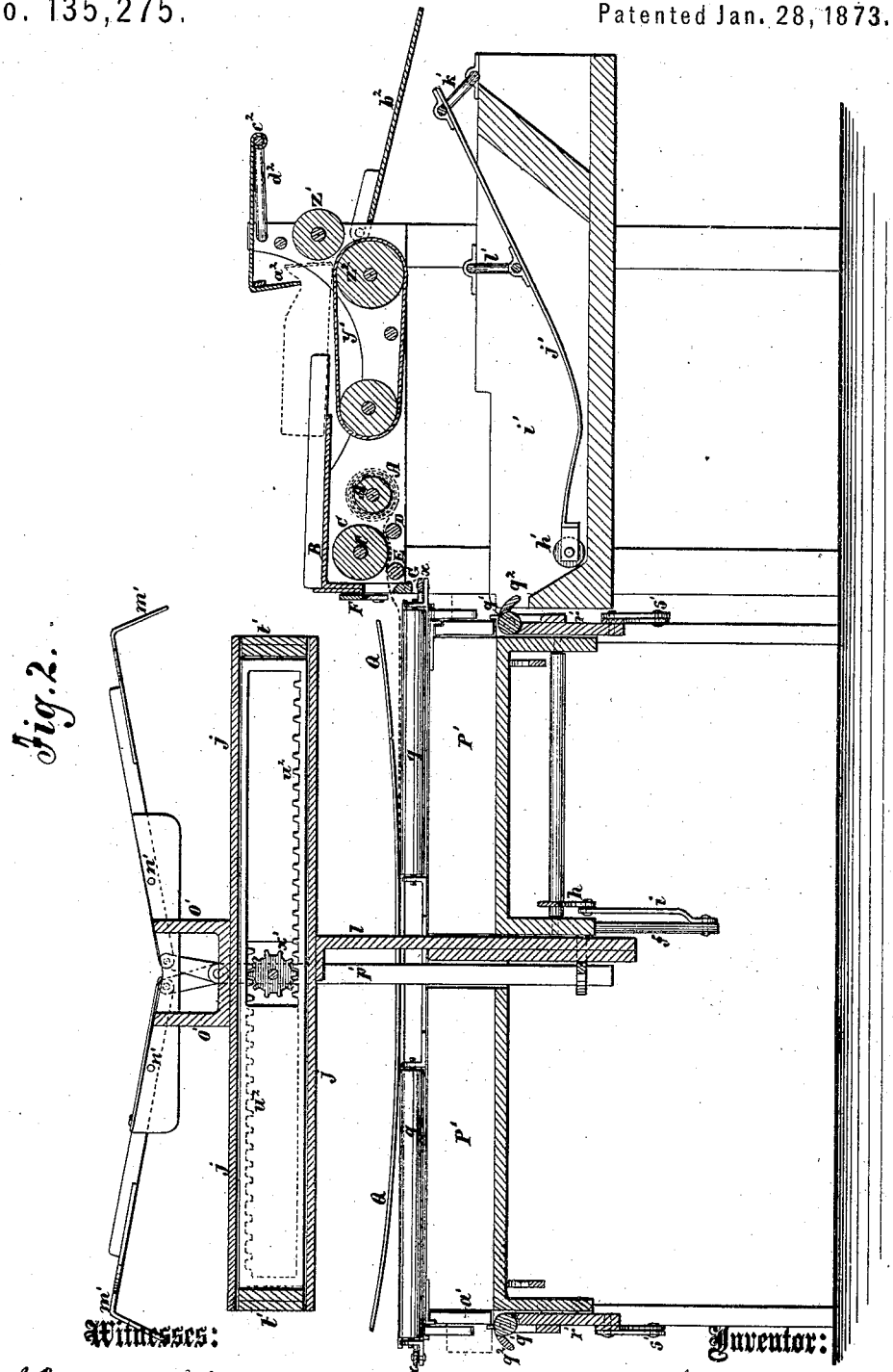
Figure 3:
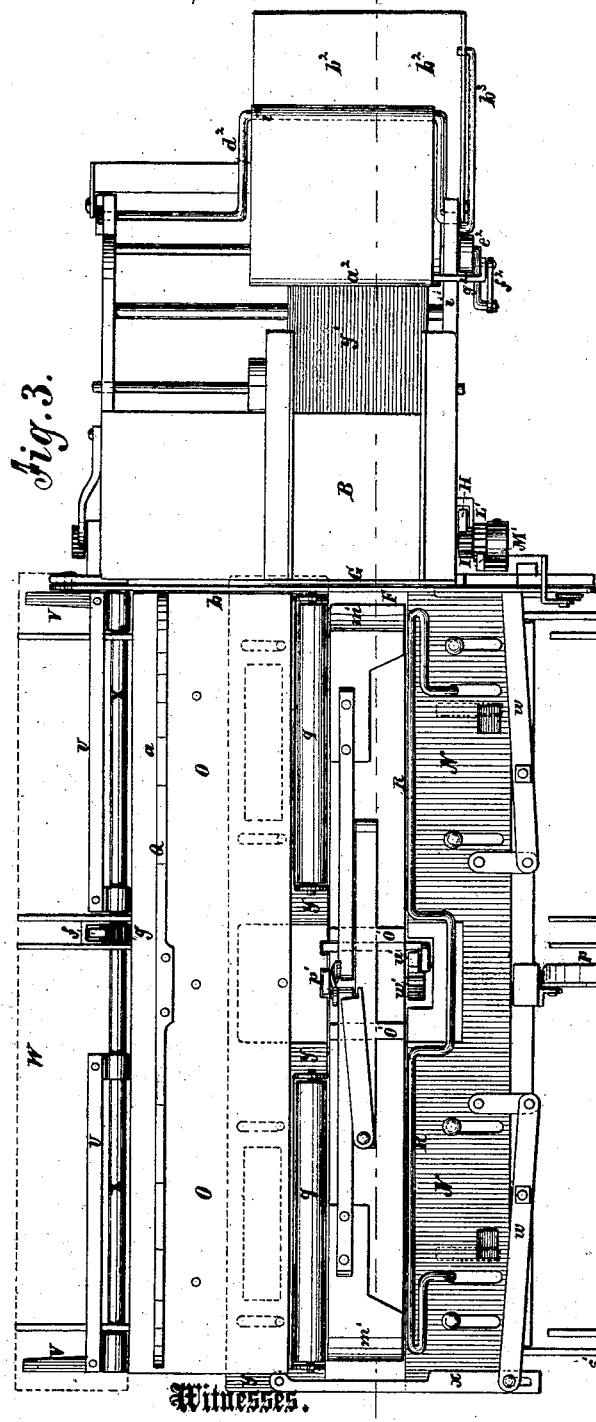
Figure 4:
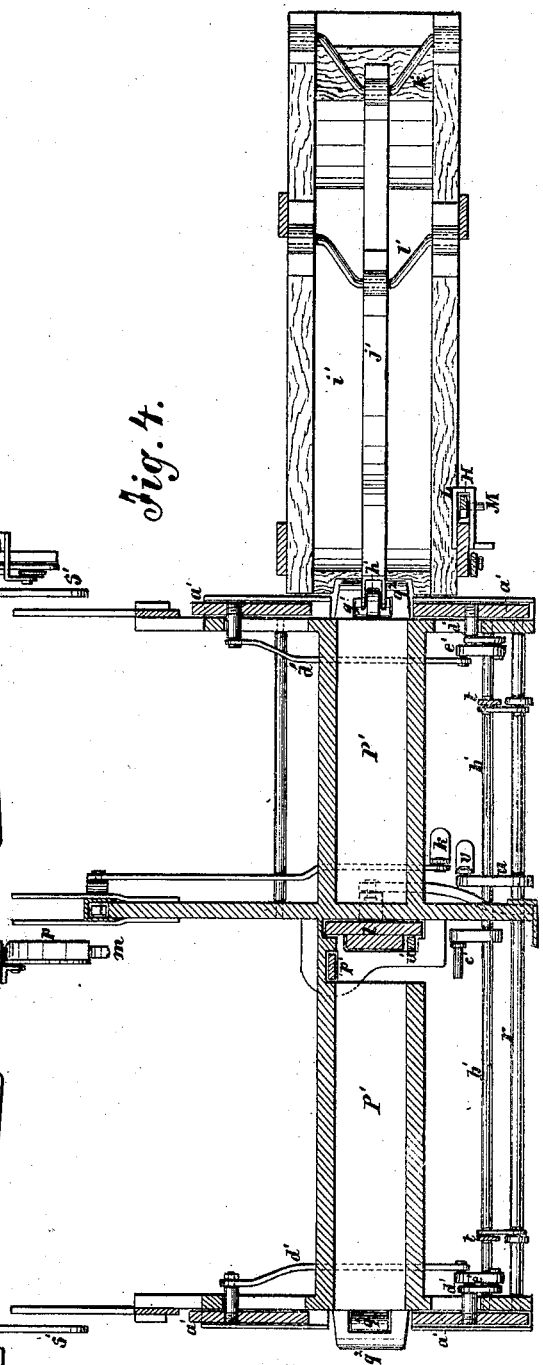
Figure 16:
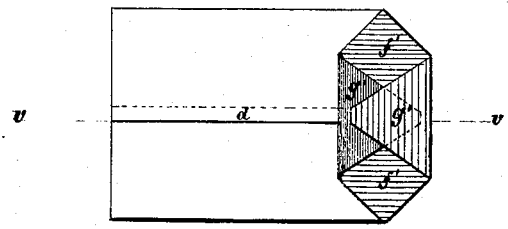
Figure 17:
Figure 10:
Figure 11:
Figure 12:
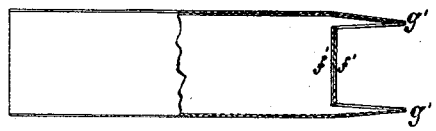
Figure 14:
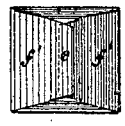
Figure 13:
Figure 15:

Figure 1 is a side elevation of my improved machine. Fig. 2 is a longitudinal sectional elevation of the same taken on the line $y\ y$ of Fig. 3. Fig. 3 is a plan view. Fig. 4 is a section on the line $x\ x$ of Fig. 1. Fig. 5 is an end elevation. Fig. 6 is an end elevation of the feeding and cutting apparatus, also the apparatus for pasting the end of the bag in folding, and for removing and folding the finished bag. Fig. 7 is a cross-section on the line $w\ w$ of Fig. 1. Fig. 8 is a cross-section on the line $z\ z$ of Fig. 1. Fig. 9 is a horizontal section on the line $a\ a$ of Fig. 1. Fig. 10 is a longitudinal section of the incomplete bag after the edges have been folded and pasted together in the lengthwise direction. Fig. 11 is a cross-section of Fig. 10. Fig. 12 is a longitudinal section of Fig. 10 with the bottom half formed. Fig. 13 is a longitudinal section of the complete bag. Fig. 14 is an inside view of the bottom of the bag. Fig. 15 is an outside view. Fig. 16 is a plan view of the bag with the bottom folded over on the flattened side as it comes from the machine ready for rolling up in the package, as represented in enlarged section in Fig. 17, the section being taken on the line $v\ v$ of Fig. 16.

Similar letters of reference indicate corresponding parts.

In the present machine only the more essential parts necessary for performing the several operations with the most simple devices for operating them are shown; but it is contemplated to embody the necessary contrivances for operating the whole in proper order by one prime mover in the machine for practical use.

The paper of which the bags are to be made being of the right width for the size of the bags when folded lengthwise, is wound in a large roll on a roller, A, which is placed in the machine under a table, B, immediately behind the feed-rollers C, D, and E, and the shears F G, from which said roller the paper is to be fed at intervals through the shears to the folding apparatus by the principal feed-roller C, which will be moved exactly the same number of turns each time in order to feed off the exact length of paper required for each bag. In this example I have represented a toothed bar, H, gearing with a pinion, I, on the end of the shaft of said feed-roller to turn it, which said bar is limited in its movements in both directions by the stops K and L and the pin M, for so regulating the quantity of paper drawn off. The pinion slips around on the shaft when the bar H returns after each feed and engages with it by a ratchet, L', and spring-pawl M', when the bar moves forward. The paper so fed out between the cutters comes on the plates N on one side and O on the other side of a large rectangular recess, P', in the table, one edge coming under the spring Q, and the other edge under a rod or bar, R, which falls upon it to keep it down smooth and hold it so as to be drawn into the recess mostly from the other side. The movable shear-blade F then comes down and cuts off the length of paper to be folded; said blade is, in this example, represented as being worked by the vertical bar S, jointed to its free end, and arranged to slide up and down in suitable guides on one side of the frame of the machine. The rod R which drops on the edge of the paper to hold it has vertical rods T extending down through suitable guides in the frame to control it, and to be used, if preferred, in raising and lowering it. After the paper has been so delivered on the plates N and O the margin outside of the spring Q and the margin along part of the end next to the cutters are pasted by the bars U and V, which till then rest in a paste-trough indicated in dotted lines W, being suspended from the rod X by arms Y, and at the proper time caused to swing over onto the paper and deliver the paste along the margins $a$ and $b$ for pasting the edges together along the lines $d$, Fig. 16, and $e$, Fig. 14. The shaft X is caused to turn for so delivering the paste by the vertically-sliding toothed bar $f$, which gears with said shaft by a pinion, $g$, and is operated by a lever, $h$, and connecting-bars $i$ and $k$, which will be caused at the proper time to swing the said pasting-bars over on the paper and back into the trough again. The paper being thus pasted and lying above the recess P', is then pressed down into said recess for shaping and folding the body of the bag by the long rectangular former $j$, suspended above it, as shown in Figs. 1 and 2, which comes down on the paper, carrying it to the bottom of the recess and folding it between its sides and the walls of the recess. This former is mounted on the top of a strong bar, $l$, arranged to slide up and down through the frame of the machine, and connected at the lower end to the short arm of a lever, $m$, pivoted at $n$, and adapted to raise said bar by being forced down at the outer end, and to hold it up by a pawl, $p$. The parts of the paper then rising above the former $j$ on each side are then folded over upon the top of the former, and pasted together by the plate N and a roller, $q$, the plate N coming forward first and pressing its part of the paper down first, so that the other part having the paste on its upper side will come on the top and be rolled down on it smoothly by the roller.

The plate N is moved forward by the rock-shaft $r$, to which it is connected by the arms $s$ and connecting-links $t$, the said shaft being turned by a crank, $u$, and connecting-rod $v$. This plate also actuates the rollers through the medium of the levers $w$, connecting-bars $x$, and the plate $y$, the latter carrying the rollers, and, like the plate N, being arranged on the table to move toward and from the center of the space over the top of the former, and the said two plates being connected by these bars and levers, as shown; said plate $y$ is arranged below the plate $o$ of the table, to allow the paper to lie smoothly on the latter for pasting. It will be noticed that the levers $w$ are connected to the bars $x$ by pins and slots in such manner that the plate N is allowed to move a short distance before the rollers are set in motion, which is for causing the plate N to fold its part of the paper under the part on the other side having the pasted margin, as before stated. The two vertical sides of the extension of the folded sheet, beyond the end of the former next to the cutters, are next folded inward, one on the other, by the sliding folders $a^1$, the one on the same side that the plate N is moving a little in advance of the other to fold its part of the paper under the other, so that the margin of the end receiving the paste along the line $b$ will be pasted onto the outside of the other part and secure these two folds together, as indicated at $e$, Fig. 14. These sides $a^1$ $a^1$ are operated by the rock-shaft $b^1$, which is worked by a connecting-rod, $c^1$, and to which they are connected by rods $d^1$ and arms $e^1$, the latter being on opposite sides of the shaft, so that the said folders are moved against the two opposite sides of the paper-cylinder simultaneously, and by one movement of the shaft, and then moved away in like manner. When these two parts of the bottom (shown at $f^1$, Fig. 14) have been thus folded and pasted together, the folders $a^1$ remain for a short time to hold them in place, while a quantity of paste is delivered upon the out or bottom side for securing the other parts $g^1$, Fig. 15, together and to the parts $f^1$. For this purpose the folders $a^1$ do not quite come together, leaving a narrow space between their ends, vertically, for the pasting-roller $h'$ to enter at the upper end against the paper and deliver the paste thereon; also, on the inner side of the lowermost part $g^1$, as it moves down along said space and over the said part $g^1$, in returning to the pasting-trough $i'$, from which it proceeds by rising upward at the beginning of this pasting operation, as aforesaid. The position of the several parts of the partly-folded end of the bag, when this operation is performed, are represented in Fig. 12. The said pasting-roller is mounted in the end of a long spring-bar, $j'$, which is mounted at its rear end on a cranked shaft, $k'$, and about one-third (more or less) of its length therefrom, on another crank-shaft, $l'$; this latter crank is a little shorter than the other, and makes complete revolutions from right to left, while the shaft $k'$ only oscillates in the upper portion of its range, whereby the said pasting-roller will, after being raised up from the pasting-trough, be moved directly forward between the parts $g^1$ of the bag against the folded parts $f^1$, and then move down along and against the front and over the upper side of the lower part $g^1$ into the trough again. The spring-bar $j'$ is made long enough to insure the coming of the roller hard against the folded parts $f^1$, but is made to spring downward to compensate for any excess of length that may be, and to hold the roller on the paper by a yielding pressure. The upper part $g^1$ is then folded down over the parts $f^1$ by the folder $m'$, which is pivoted at $n'$ on the arm of a stand, $o'$, mounted on the former $j^1$ beyond the top end of the bag, the said folder being caused to swing down over the end of said former by the vertically-sliding bar $p'$ jointed to its rear end, and which is forced upward by any suitable means. This folder $m'$ is a thin plate of metal adapted to remain and hold the paper folded down by it until the lower part $g^1$ is folded up over it, and then withdraw just in advance of the said lower part as it is pressed on the upper part from below upward by a roller, $q^1$, mounted in the upper end of a plate, $r'$, which is moved up at the proper time by a lever, $s'$, or any other equivalent contrivance. This plate $r'$ has a curved lip, $q^2$, over which the paper is drawn up to the roller, and which holds the part $g^1$ in such position as to cause it to receive the paste properly from the roller $h'$ as it descends to the paste-trough $i'$.

This completes the construction of the bag, and it is then raised up out of the folding-recess P' to be discharged off the end of the former by the raising of the former itself, which is effected by the lever $m$, and it is held up for the discharging of the bag, and to admit another piece of paper below for the next bag to be made, by the pawl $p$. The discharger, which consists of the removable end $t'$ of the former and the long toothed-bar $u^2$, is then moved outward by the rack $u^1$ and pinions $w'$ and $x'$, and carries off the bag, (as shown in dotted lines in Fig. 9,) and along the table B, Fig. 2, till the bottom comes in contact with the endless-belt carrier $y'$ which conveys it to the front of the folding-roller $z^1$, above the outer carrier-roller $z^2$, as shown in Fig. 2, where a folding-blade, $a^2$, comes down upon the upper side of the bag, just behind the upper edge of the bottom, to break down the upper side of the bag and tilt the bottom backward, so that the lower edge of the bottom will be drawn in between the rollers in such manner that the cylindrical part of the bag will be folded down flat, and the stiff bottom will be folded over on a portion of the part above in passing between said rollers, as shown in Fig. 16; at the same time the bag is delivered from the machine on the chute $b^2$, and the upper portion is then wrapped around the bottom by hand, as shown in the enlarged sectional Fig. 17, making a compact flat package that can be packed in boxes or bales without injury to the bottom.

The folding-blade $a^2$ consists of an angle-rod plate, pivoted at $c^2$ on an immovable crank-rod, $d^2$, and it is operated by a crank-shaft, $e^2$, of the roller $z^2$, to which it is connected by a rod, $f^2$, and an arm $g^2$, the latter projecting from its angle. In practice, motion will be imparted to this shaft and roller intermittingly by a toothed bar and pinion, in the same manner that the feed-roller C is operated, but it may be otherwise operated if preferred. The chute is hinged to the frame and supported by a pivoted brace, $b^3$, in such manner that it can be readily elevated to afford access to the paste-trough below.

It will be noted that the folding cavity, former, pasting apparatus for the first pasting operation, the folding devices used in the construction of the bag, and the discharger, are all arranged in duplicate on two opposite sides of a frame or table, independent of the frame carrying the feeding and cutting apparatus, and the apparatus for folding and discharging the completed bag; and that the devices for operating the said parts, so far as they are operative, apply to both in such manner that a double machine can be provided with less cost and complication of machinery than would be required for two single machines.

Having thus described my invention, I claim as new and desire to secure by Letters Patent—

1. The combination, with the recessed table, paper-holding bar, and spring, of the pasting-bars U V, substantially as and for the purpose set forth.

2. The combination, with former, recessed table, and end-folders, of the pasting-roller $h'$, substantially as and for the purpose specified.

3. The combination, with the former and with folders $a^1$ $a^1$ that do not come quite together, of the pasting-roll $h'$, arranged as described on a spring-bar, $j$, which is rotated by a crank, $l'$, so as to lift said roll to its maximum height, and then thrust it forward between the ends of said folders, as and for the purpose set forth.

4. The combination of pasting device $h'$ $j'$ operated by crank $l'$, of the lip $q^2$ arranged on the plate $r'$, as described, to hold the lower part $g^1$ of bag, so as to receive the paste from said roll on its downward movement.

5. The combination of plates N $y$, roller $g$, connecting-bar $x$, and levers $w$, arranged as and for the purpose specified.

6. The folding-roller carrying-plate $y$, arranged under the pasting-plate O, substantially as and for the purpose described.

7. The discharger having toothed bar $w$ combined with pinions $w'$ $x'$, and toothed bar $v'$, arranged substantially as and for the purpose set forth.

TRUMAN HOTCHKISS.

Witnesses:
JOSEPH H. STAGG,
CLAUDIUS B. CURTIS.